Figure 1:
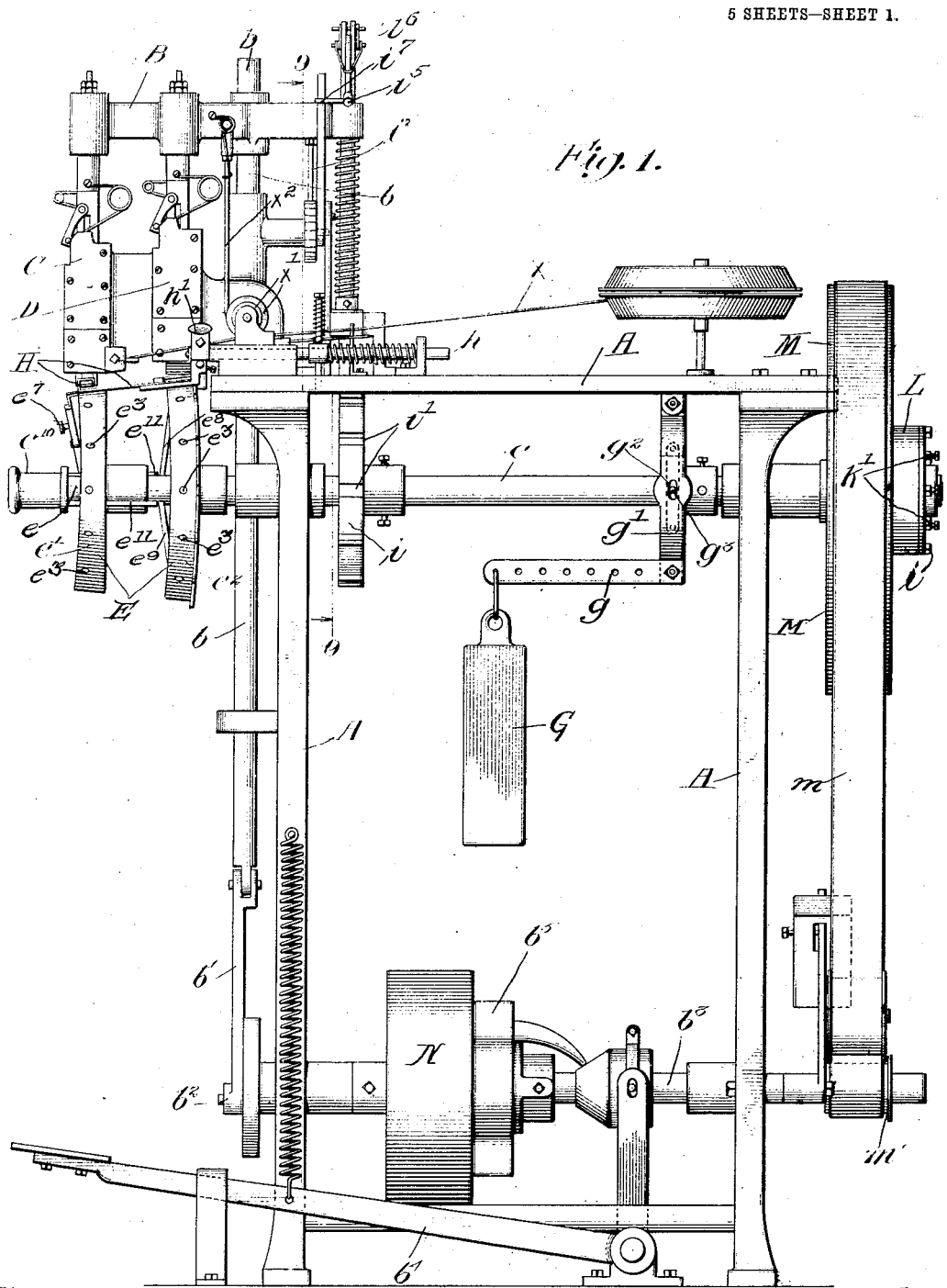

No. 810,270. PATENTED JAN. 16, 1906.
J. EKLUND & E. L. WALKER.
MACHINE FOR USE IN MAKING BASKETS OR OTHER RECEPTACLES.
APPLICATION FILED NOV. 16, 1903.

5 SHEETS—SHEET 1.

Witnesses:
Robert H. Weir
M. J. McPike

Inventors
John Eklund
Enos L. Walker
By Bulkley & Durand
Attys

No. 810,270. PATENTED JAN. 16, 1906.
J. EKLUND & E. L. WALKER.
MACHINE FOR USE IN MAKING BASKETS OR OTHER RECEPTACLES.
APPLICATION FILED NOV. 16, 1903.
5 SHEETS—SHEET 2.
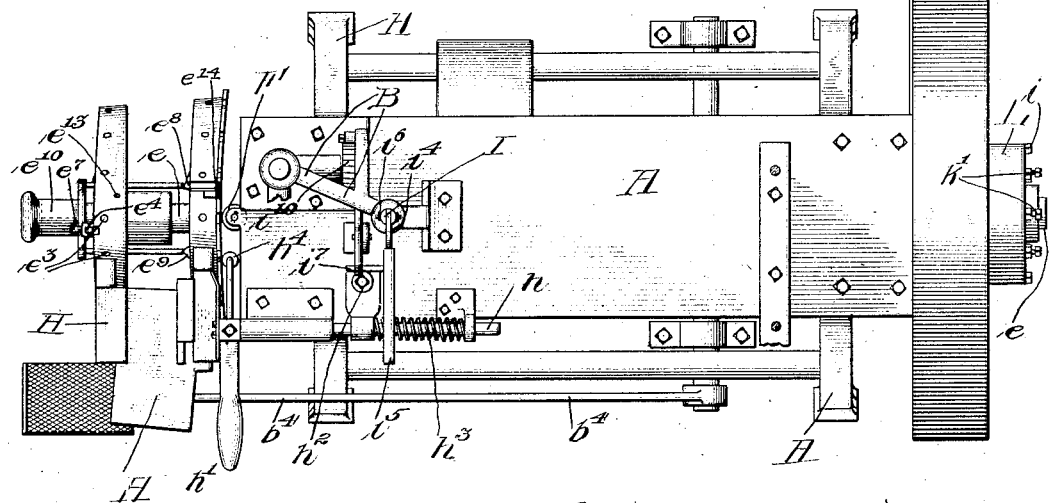
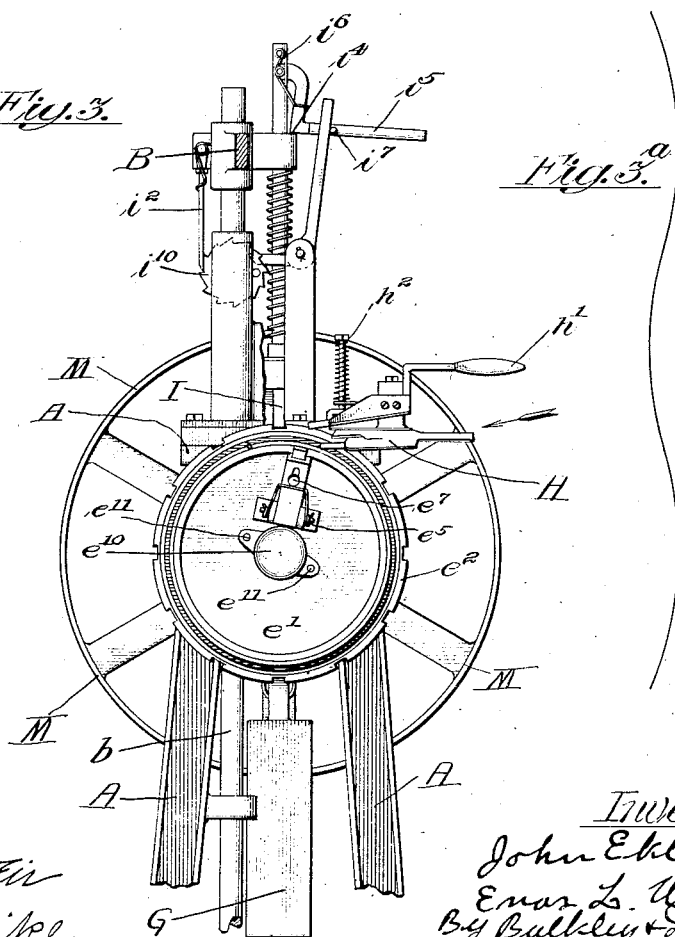
Witnesses:
Robert H. Weir
M. J. McPike
Inventors:
John Eklund
Enar L. Walker
By Bulkley & Durand
Attys.

No. 810,270. PATENTED JAN. 16, 1906.
J. EKLUND & E. L. WALKER.
MACHINE FOR USE IN MAKING BASKETS OR OTHER RECEPTACLES.
APPLICATION FILED NOV. 16, 1903.
5 SHEETS—SHEET 3.
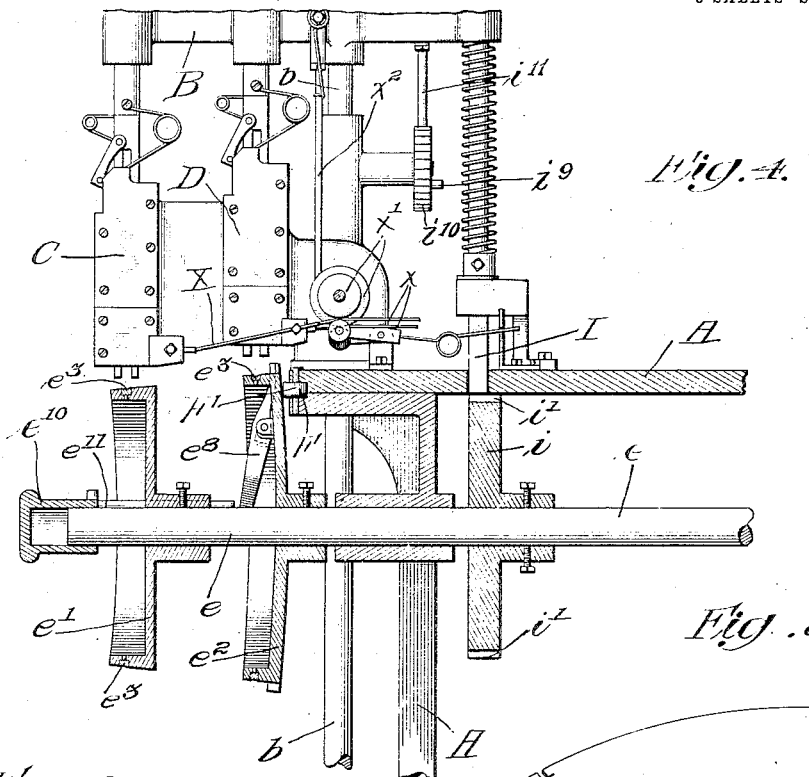
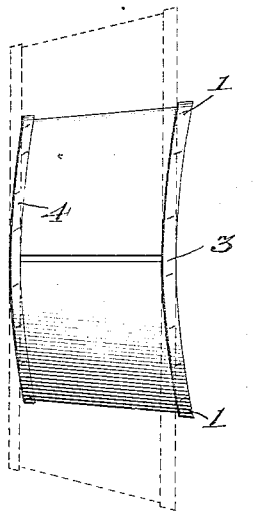
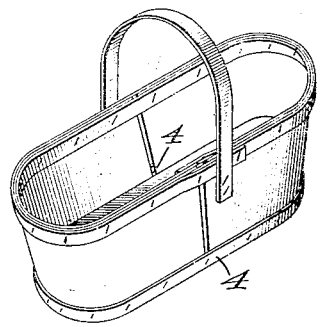
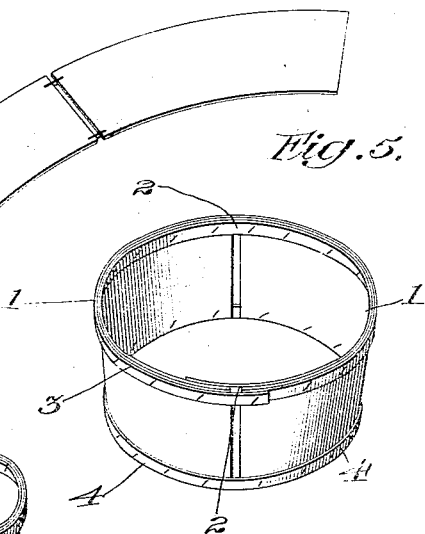
Witnesses:
Inventors
John Eklund
Enos L. Walker
By Bulkley & Durand
Attys

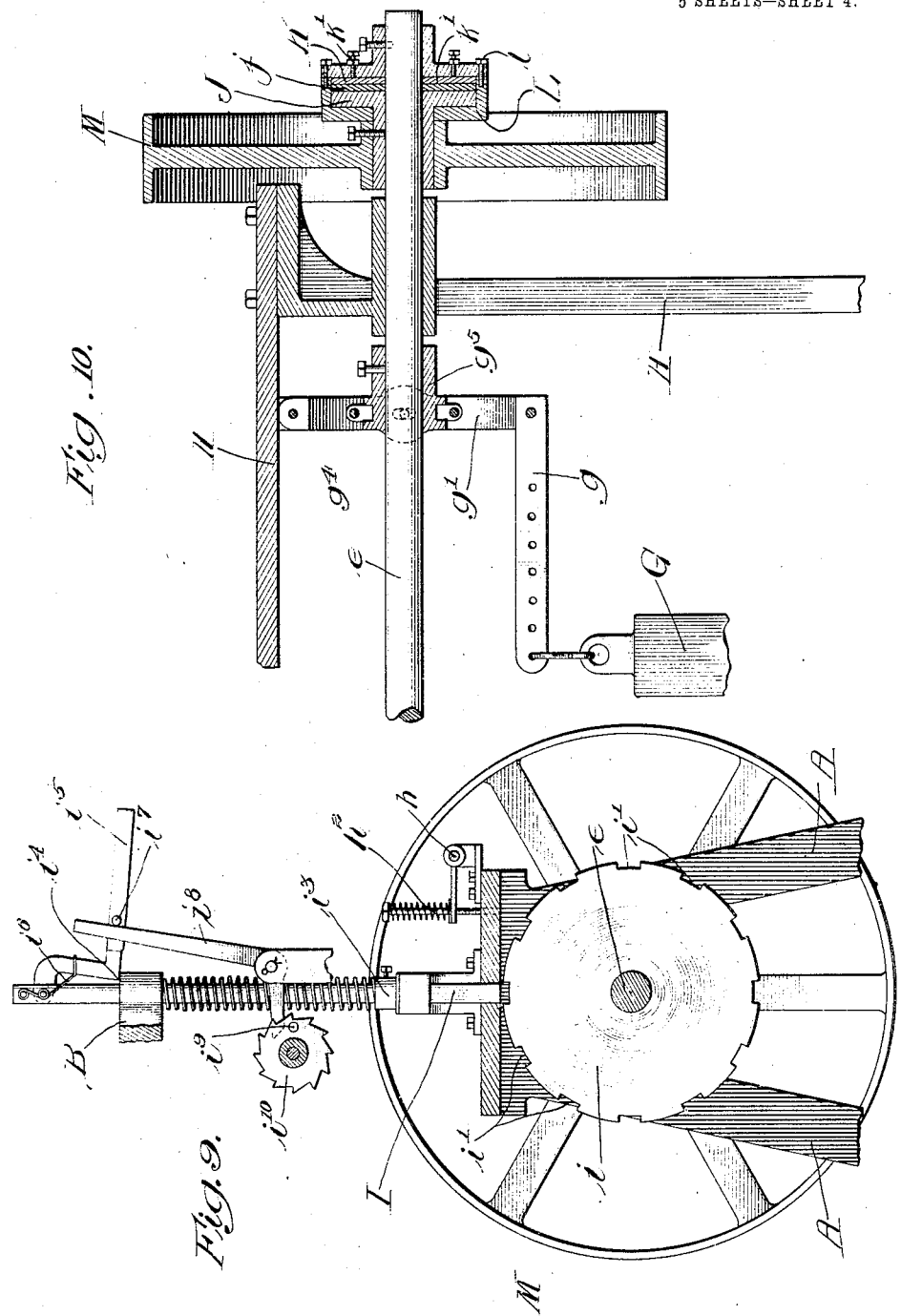

No. 810,270. PATENTED JAN. 16, 1906.
J. EKLUND & E. L. WALKER.
MACHINE FOR USE IN MAKING BASKETS OR OTHER RECEPTACLES.
APPLICATION FILED NOV. 16, 1903.

5 SHEETS—SHEET 5.

Witnesses:
Robert H. Weir
M. J. McPike

Inventors
John Eklund
By Enos L. Walker
Bulkley & Durand
Attys

UNITED STATES PATENT OFFICE.

JOHN EKLUND, OF ST. JOSEPH, MICHIGAN, AND ENOS L. WALKER, OF ST. LOUIS, MISSOURI.

MACHINE FOR USE IN MAKING BASKETS OR OTHER RECEPTACLES.

No. 810,270. Specification of Letters Patent. Patented Jan. 16, 1906.

Application filed November 16, 1903. Serial No. 181,295.

*To all whom it may concern:*

Be it known that we, JOHN EKLUND, a resident of St. Joseph, Berrien county, Michigan, and ENOS L. WALKER, a resident of St. Louis, in the State of Missouri, citizens of the United States of America, have invented a certain new and useful Improvement in Machines for Use in Making Baskets or other Receptacles, of which the following is a specification.

Our invention relates to machinery for the manufacture of baskets of that character in which the bottom consists usually of an oblong strip of wood with rounded ends and in which the vertical walls of the basket consist of outwardly-inclined sides extending lengthwise of the basket and of rounded or curved and outwardly-inclined ends, both the top and bottom portions of the oblong basket thus constructed being reinforced or bound together by correspondingly-shaped circumferentially-extending hoops.

Broadly considered, our invention contemplates the provision of machinery whereby baskets of this particular type may be constructed in an improved and economical manner, the vertical walls of the basket being first constructed on an annular or truly-circular form and the unfinished basket being then given the desired oblong form by simply pressing the oblong bottom down into the bottom of the band-like structure thus provided and by then suitably securing the lower marginal or edge portions of this band-like structure in place upon the straight sides and the rounded ends of said bottom piece.

More specifically considered, our invention contemplates a machine having a rotary and axially shifting form—that is to say, a form which not only rotates automatically during the process of making the said circular band-like structure, but which also has an automatic axial shift during such rotation, the rotation of the form being necessary in order to reduce the flat strips of material to the desired circular and band-like form, but the automatic axial shift of the form being with respect to the marginal curvature of the blanks from which the band-like structure is constructed, this curvature being necessary in order to give the finished basket the desired shape—that is to say, in order to give the basket a level top and bottom and outwardly flaring or inclined walls.

As another feature of improvement our invention contemplates the provision of a friction-feed for obtaining an intermittent rotation of the form, said feed consisting practically of a loose connection which has sufficient friction or tension to rotate the form when the latter is not positively held against rotation, but which is capable of yielding and allowing the frictional surfaces to slide one upon the other when a positive obstruction or stop device is interposed at the proper time for stopping the rotation of the form. The frictional power-transmitting connection thus provided for rotating the form when combined with the automatic stop device operates, as stated, to give the form the intermittent rotary movement necessary in the process of reducing the blank material to band-like form.

Our invention also contemplates the provision of certain details and features of improvement tending to increase the general serviceability and efficiency of a machine of this particular character.

The nature and advantages of our invention will, however, hereinafter more fully appear.

Figure 11:
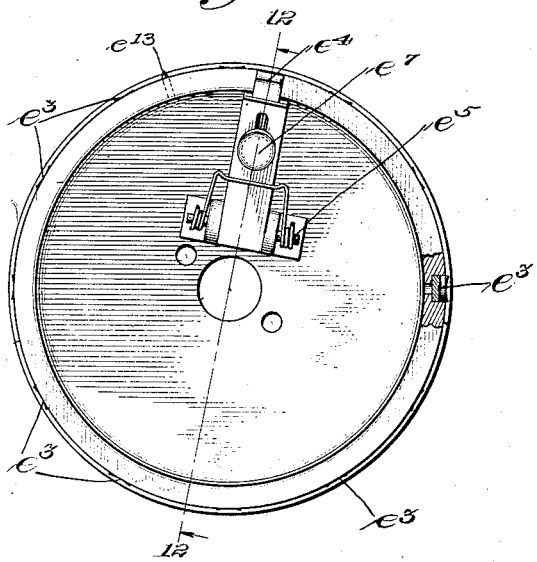
Figure 12:
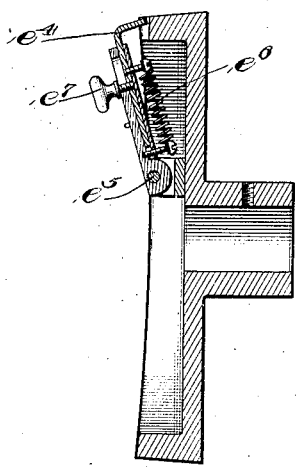
Figure 13:
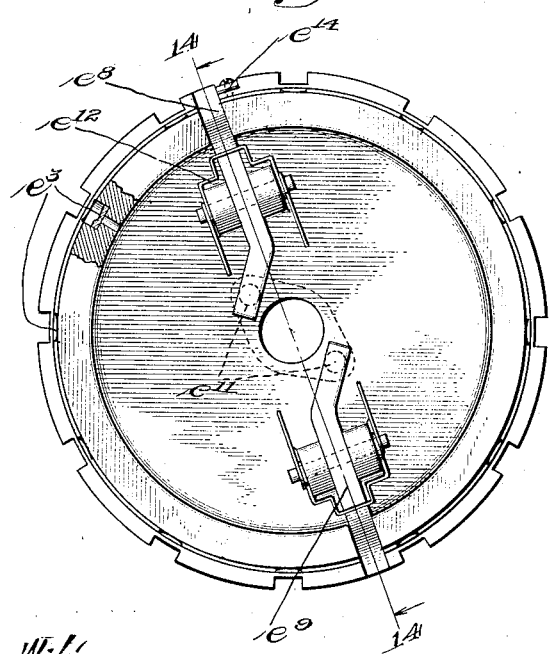
Figure 14:
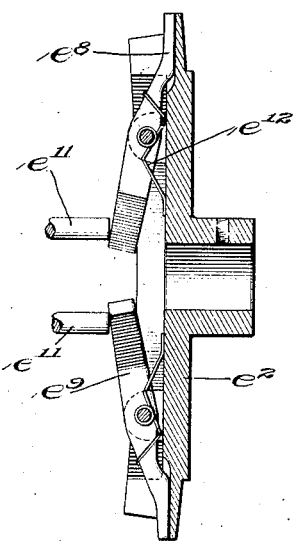

In the accompanying drawings, Figure 1 is a side elevation of a machine embodying the principles of our invention. Fig. 2 is a plan of the machine shown in Fig. 1, the stapling mechanism being broken away for the purpose of more clearly showing the rotary form and adjacent parts. Fig. 3 is a front elevation of the upper portion of the machine shown in Fig. 1, the stapling mechanism being broken away, as indicated in Fig. 2. Fig. 3ª is a diagrammatic view illustrating the curved line along which each row of clench-blocks extends, assuming such line to have been reduced to a horizontal plane, and illustrating the necessity for so combining the stapling mechanism with the form that the same are capable of relative shift in the direction of the axis of the form. Fig. 4 is a vertical section, on a larger scale, through the rotary form and the upper portion of the body-frame and showing the stapling mechanism in elevation with certain upper portions broken away. Fig. 5 is a perspective of the slightly-flaring circular band-like structure which constitutes the finished product of our improved stapling-machine. Fig. 6 is a perspective of the finished and completed basket, the same being composed of the said band-like structure reduced to oblong form by the insertion of the oblong bottom piece. Fig. 7 is a side elevation of the structure shown in Fig. 5, illustrating the slight curvature which the structure is given in order that the finished basket may have the desired form and which necessitates the slight automatic axial shift which the form is given during its rotation and showing also the flaring nature of this band-like structure, this flare being also necessary in order to give the finished basket the desired shape. Fig. 8 is a perspective of two of the curved and connected blanks from which the structure shown in Fig. 5 is constructed. Fig. 9 is a detail section on line 9 9 in Fig. 1 on a larger scale and illustrating a stop or locking device for holding the form against rotation while the staples are being driven, and showing also the tripping device by which the lock is prevented from unlocking or releasing the form when the last staples are driven. Fig. 10 is a detail sectional view, on an enlarged scale, of the improved frictional-feed or power-transmitting device by which the form is rotated and which coöperates with the automatic stop or locking device in producing an intermittent rotary movement on the part of the form, and showing also the weight device which is provided for constantly and yieldingly opposing longitudinal shift on the part of the shaft upon which the form is mounted, and which, in conjunction with a roll engaging the cam-like inner face of the form, constitutes the means for producing the automatic axial shift of the form during its rotation. Fig. 11 is an enlarged outer end view of the rotary form. Fig. 12 is a detail sectional view on line 12 12 in Fig. 11. Fig. 13 is an outer face view of the inner and larger section of the rotary form. Fig. 14 is a detail sectional view on line 14 14 in Fig. 13.

As thus illustrated, our improved stapling-machine for making the peculiar band-like structures which are useful in making a particular form of basket and which when embodied in such baskets constitutes the sides and ends thereof, may comprise an upright frame or body A of any suitable or desired construction, but preferably of such a character as to provide suitable bearings for the various rotary and operative parts and of a height to support the rotary form in a suitably-elevated position, it being understood that it is desirable and preferable to have the machine of such character that the operator may stand upright while applying or manipulating the blank material upon the rotary form.

The reciprocating head B can be mounted in the usual manner upon the upper end of a vertically-reciprocating rod $b$, which extends downwardly and connects, by means of a pitman $b'$, with a crank $b^2$, carried by a rotary power-shaft $b^3$. The treadle $b^4$ of the usual form is provided for operating the clutch mechanism $b^5$, which latter can be of any suitable known or approved construction, it being understood that the said shaft is driven or rotated constantly and that the foot-lever and clutch mechanism are necessary in order that the operator may readily start and stop the machine. When the clutch is closed, the rotation of the shaft reciprocates the head B, which latter in turn then operates the staple drivers and formers involved in the stapling mechanisms C and D, which latter can also be of any suitable known or approved construction. The wire X, from which the staples are to be made, can be fed to the stapling devices in the usual and well-known manner and can be given an intermittent feed through the medium of the feed-rolls X', which latter are rotated upon the upward movement of the head B by means of a pawl or dog $X^2$ engaging a ratchet-wheel on the shaft of the upper rolls. These features—that is to say, the treadle and clutch mechanism for starting and stopping the machine, the staple forming and driving devices, and the wire-feeding devices—are all features which are old and well known in the art to which our invention relates and which do not therefore need any description, and for the same reason these features have not been illustrated in detail in the drawings.

One of the principal features of our invention consists of the rotary form E, which is mounted upon a horizontally-disposed shaft $e$, and which is composed of two annular or wheel-like sections $e'$ and $e^2$, the outer and smaller sections $e'$ being located directly beneath the stapling mechanism C, while the inner and outer section $e^2$ is located directly below the stapling mechanism D. Both of these sections of the form E are keyed or otherwise rigidly mounted upon the shaft $e$, so as to rotate therewith and when viewed in a direction parallel with the axis of rotation are annular or circular in form, as shown in Figs. 3, 11, and 13. The periphery of each section is "beveled," so to speak, so that when combined and mounted on the shaft, as shown, these two sections, in effect, provide an outwardly-tapering form on which to construct the circular but upwardly and outwardly flaring band-like structure shown in Fig. 5. The section $e'$ is provided with a plurality of angles or clench-blocks $e^3$, adapted to coöperate with the stapling devices in clenching the ends of the staples driven through the veneer or other material from which the baskets are to be constructed, and the inner section $e^2$ is provided with similar clench-blocks. The said outer section is provided, preferably, with a clamping device for clamping and holding the veneer or other material firmly upon the periphery or circumferential surface of the form, and which consists of a hook $e^4$, pivoted to the form at $e^5$. This hook is made in two sections, which are adapted to slide relatively one upon the other and are held normally together by the spring $e^6$. The hook $e^4$ at the upper end of the device can be raised by grasping the handle $e^7$, and when the overhanging portion of the hook is allowed to bear down upon the veneer or other material the spring $e^6$ then holds it tightly in place. In this way the device is adapted to effectively clamp and hold the veneer or other material tightly upon the periphery or circumferential surface of the form. The inner section $e^2$ is provided with a pair of pivoted arms $e^8$ and $e^9$, having their outer ends arranged to work in slots in said section $e^2$. These outer end portions when the veneer or other material is applied to the circumference of the form bear against the inner or top edge of the structure shown in Fig. 5, and by pressing upon their inner ends these arms can then be employed for disengaging or removing the band-like article or structure from the form. This pressure can be applied in any suitable manner—as, for example, by providing the outer ends of the shaft $e$ with the sliding handle portion $e^{10}$ and by providing this handle with rods or projections $e^{11}$, adapted to extend through openings in the form-section $e'$ and engage the ends of the levers or arms $e^8$ and $e^9$. Springs $e^{12}$ can be employed for holding said arms or levers in their normal positions, and in the arrangement shown these arms or levers can be easily operated and the finished band thrown from the form by simply pressing on the handle $e^{10}$. The outer section $e'$ is preferably provided with a stop $e^{13}$ and the inner section $e^2$ with a stop or gripping device $e^{14}$, whereby one end of the connected blank (shown in Fig. 8) can be properly and accurately applied to the form, the stops accurately positioning the end of the blank upon the form and the overhanging character of the gripping device $e^{14}$ exerting a certain amount of grip or clamping pressure upon one corner of the veneer or blank material. The device $e^{14}$ is provided with a screw, as shown, whereby it can be adjusted with respect to different thicknesses of material. In other words, the device $e^{14}$ assists in determining the position of the material on the form and simply provides a recess into which one corner of the material can be inserted.

Referring to Fig. 2, it will be seen that the form is concave on its inner face, the surface being curved in one direction only, and the point of maximum depth of the concavity occurring along the line extending through the axis of the form and intersecting the points on the form where the ends of the two blanks shown in Fig. 8 are located when placed upon the form. Thus each circumferential row of clench-blocks in the form extends along a curved or irregular line, which line, if flattened out and reduced to a level plane, would have the appearance of the line shown in Fig. $3^a$. Thus the completed band-like structure is higher at the points 1 1 when viewed from the side, as shown in Fig. 7, than at the points 2 2, where the ends of the blanks meet. This, as explained, is necessary in order that the band-like structure when lengthened out and reduced to the form shown in Fig. 6 may, in effect, provide the basket with a level top and bottom and with flaring side end walls.

The blanks shown in Fig. 8 are necessarily curved, so that the basket shown in Fig. 6 may have a level top and bottom, notwithstanding the fact that its sides and ends incline outwardly. Hence inasmuch as the form is preferably truly circular in form and characterized by a uniform bevel or outward taper throughout its circumference it is desirable, therefore, that the inner face of the form be of the character described or at least that the lines along which the clench-blocks are located be curved or varied somewhat from straight or direct lines, so as to permit the staples and hoop portions 3 4 to follow as much as possible the curvature or general trend of the edges of the blanks. Such being the case it is necessary with stationary stapling devices to provide some means for shifting the form axially and automatically during its rotation, so as to insure having each clench-block moved to a position directly beneath the staple-driver with which it is to coöperate in driving a staple. This can be accomplished in various ways— as, for example, by providing a roll F, adapted to engage the curved or cam-like inner face of the form, the said roll being suitably mounted in bearings on the body-frame. This roll as the form rotates will through the medium of the irregular or cam-like inner face of the form cause the shaft $e$, upon which the form is mounted to move longitudinally in its bearings, and to thereby keep the clench-blocks rotating directly beneath the staple-drivers. In order to make it impossible for the form to leave the roll, a weight G may be provided and arranged in such manner that it will tend constantly to move the shaft $e$ in a direction to cause the form to bear tightly against the said roll. As a simple and effective arrangement the said weight can be hung upon an arm $g$, secured to the lower end of the circular yoke $g'$, which latter is pivoted at its upper end to the frame or body A. The said yoke, as shown more clearly in Fig. 1, can be provided at its sides with slots $g^2$, adapted to receive the pins $g^3$ on the sides of a split ring $g^4$. This split ring $g^4$ is adapted to engage the groove or channel in a collar $g^5$, which is secured rigidly upon the shaft $e$. As the arm $g$ projects toward the front of the machine the tendency of the weight, as stated, is to pull the shaft rearward in a direction to keep the cam-like track provided by the curved or concave inner face of the form pressed tightly against the roller F. Thus as the shaft rotates it shifts longitudinally and in a manner to successively bring the clench-blocks directly beneath the staple-drivers.

It is desirable to provide some means for insuring an accurate and proper disposition or arrangement of the veneer or blank material upon the form, and to such end I provide a guard or guiding device H, which is preferably mounted upon an oscillatory shaft $h$, which latter is in turn mounted in suitable bearings on the body-frame. The said guard or guiding device is, it will be observed, so formed and constructed as to properly and accurately guide the veneer or blank material onto the form and is provided with a handle $h'$, whereby the said shaft $h$ can be oscillated or rocked for the purpose of raising the guard or guide away from the form—as, for example, when the completed structure is to be removed from the form. A spring device $h^2$, consisting of a coil-spring adapted to bear upon an arm extending from the shaft $h$, may be provided for holding the guide or guard in its normal or operative position. It will be observed that this guard or guiding device can be made of sheet metal, providing upper and lower walls and also side walls whereby to accurately and properly guide the material onto the form.

The shaft $h$ is preferably provided with a coil-spring $h^3$, which, in conjunction with the roller $h^4$, carried by an arm on said shaft, is adapted to cause the guard or guiding device H to move back and forth in unison with the axial shift or movement of the form. This, it will be understood, is desirable in order that the said guard or guiding device may follow the circumferential contour or formation of the form, so as to preserve at all times the accurate and proper feeding of the blank materials to the rotating form. The said roller $h^4$ is adapted to engage the cam-like track or surface provided by the concavity or curved inner face of the form in the same manner that this surface is engaged by the roller F. In this way the spring $h^3$ and the said roller $h^4$ are adapted to coöperate in preserving the proper relation between the rotary form and the guard or guiding device H.

The form is desirably held positively against rotation during the driving of the staples, and hence it has an intermittent rotation, the staples being driven while the form is stationary and the form then being released and rotated for, say, one-twelfth of its circumference in order to bring the next pair of clench-blocks into position to receive and clench the next or succeeding pair of staples. Any suitable arrangement can be employed for automatically locking or unlocking the form and for thus alternately holding it against rotation and releasing it. For example, and as more clearly shown in Fig. 9, a vertically-arranged locking member I can be so disposed in the rear of the stapling mechanism that its lower end is adapted to engage the notched periphery of the wheel or disk $i$ on the shaft $e$. This notched wheel or disk $i$ is rigidly secured to the shaft $e$ in any suitable manner and is provided with a plurality of notches $i'$, as shown. These notches are arranged to correspond in number to the number of clench-blocks provided on each section of the form, it being preferable, also, to have these notches in line with the said clench-blocks.

The vertically-reciprocating locking member or dog I is carried by the vertically-reciprocating head B and is thus adapted to rise and fall with the upward and downward movements of the head and to move up and down simultaneously with the movement of the staple-drivers. This locking member or dog I is yieldingly connected with the head, however, through the medium of a coil-spring $i^2$, adapted to be compressed between a collar $i^3$ on the said vertically disposed and reciprocating member I and the lower surface of the head B. Thus each time the head descends the staple-drivers move downward in unison with the locking member or dog I, and as soon as the said dog engages a notch in the wheel $i$ the shaft $e$ stops rotating, thereby retaining the clench-blocks in position to receive the downward pressure of the staple-drivers. The dog or locking member I moves downward only far enough to engage the bottom of a notch in the disk, and the head B then completes the downward movement necessary for the driving of the staples, the spring $i^2$ thereby being slightly compressed. Upon rising the head B strikes the shoulder $i^4$, provided by the elbow portion of the hand-lever $i^5$. This hand-lever is, it will be observed, pivoted to the top of the dog or locking member I, and the shoulder $i^4$ is held normally against said locking member by the action of the spring $i^6$. In this way the said head B in rising not only lifts the staple-drivers and staple-formers into their normal positions, but also lifts the dog or locking member I out of engagement with the notched wheel $i$, thereby releasing the shaft $e$ and allowing it to give the form a partial rotation. The hand-lever $i^5$ is provided with a pin $i^7$, adapted to be engaged by the upper end of the bell-crank lever $i^8$, which is pivoted on a frame. The lower and shorter arm of this bell-crank lever is adapted to be engaged by a pin $i^9$ on a rotary ratchet-wheel $i^{10}$. This wheel is mounted in suitable bearings on the frame and is adapted to be intermittently rotated by a pawl $i^{11}$, carried by the head B. The number of teeth with which the ratchet-wheel $i^{10}$ is provided corresponds to the number of notches in the wheel $i$ and to the number of clench-blocks in each section of the form. Consequently upon the driving of the last staples the pin $i^9$ is caused to strike the lower arm of the lever $i^8$, thereby throwing the shoulder $i'$ out of engagement with the head B. In this way the means for operating the locking device for locking the form against rotation is automatically tripped and rendered inoperative upon the driving of the last staples, so that the head B in then rising cannot cause the locking device to release the form. In other words, after the last staples are driven the locking mechanism is then automatically tripped for the purpose of enabling it to retain the form in its locked condition. The handle $i^5$ can be employed for manually restoring the locking device to its normal condition.

The power-transmitting connection between the shaft $b^3$ and the shaft $e$, whereby the form is rotated, can be of any suitable form or construction, but as a feature of further and special improvement we preferably employ the friction-feed or power-transmitting connection shown in Fig. 10. This frictional device comprises two members J and K, the former being loose upon the shaft $e$ and the latter being keyed or otherwise secured thereto. The loose member of the friction-clutch thus provided is preferably provided with one or more layers of paper $j$, while the opposing face of the keyed member is preferably provided with a layer or plate of steel or other like material $k$. The loose and keyed members thus constructed are clamped face to face by means of the clamping plate or ring L, which engages the member J, and by means of the screws or bolts $l$, which latter bind the parts K and L firmly together. The belt-pulley M is secured rigidly upon the hub portion of the loose member J, and consequently this loose member is rotating constantly regardless of whether the shaft $e$ is rotating or not. The connection between the pulley M and the shaft $b^3$ may consist of a belt $m$ extending around said pulley and around a similar pulley $m'$ on the shaft $b^3$. The degree of friction between the members J and K necessary for driving the shaft $e$ can be regulated by means of the adjusting-screw $k'$, extending through the keyed member K and bearing against the back of the steel plate $k$. In this way the rotation of the shaft $b^3$ not only operates the stapling mechanism, but also, through the medium of the friction-clutch device thus provided, rotates the shaft $e$, but only when this shaft is not held against rotation by the locking member or dog I. As stated, the member J is rotating constantly; but owing to the friction existing between this member and the member K the shaft is rotated instantly as soon as the dog or locking member I is moved out of engagement with the notched disk or wheel $i$. A friction-feed of this character is simple and positive in action and enables the machine to run at high speed. In other words, the proper feeding action is insured regardless of the speed at which the machine is running, and in this connection it is obvious that this feature of our invention—that is to say, the friction-feed—can be employed with various kinds of stapling machinery and in various other machines where an intermittent rotation of a shaft is desirable or necessary.

The mode of operation is obvious. The blanks shown in Fig. 8, together with the hoop portions 3 and 4, are fed through the guard or guiding device H, and the ends of these materials are secured firmly in place on the form by means of the devices $e^{14}$ and $e^4$, previously described. The lever $b^4$ is then depressed, thereby causing the shaft $b^3$ to rotate. The rotation of this shaft is immediately communicated to the stapling mechanism through the pitman $b'$, and the vertically-reciprocating rod $b$ and the head B and the first pair of staples having been driven the dog or locking device I then releases the shaft $e$, allowing the frictional clutch device to partially rotate the said shaft. The rotation is of course then interrupted at the proper time by the downward movement of the locking member I, so as to hold the succeeding pair of clench-blocks on the form in position to receive the second pair of staples. Thus the form is held against rotation each time a pair of staples is driven through the material and clenched by the clench-blocks, and the stapling devices are then elevated simultaneously with the unlocking or releasing of the shaft $e$, thereby allowing the form to have the necessary rotation during the intervals between the driving of the staples, and, as previously stated, the belt-pulley N rotates constantly during the making of the band-like structure of which the sides and ends of the basket are composed in the completed form and as long as the operator keeps his foot on the lever $b^4$. As soon as the staples are driven and the form is held against further rotation in the manner previously stated the completed structure can be thrown off the form by pushing on the handle $e^{10}$. With further respect to the irregular trend of the lines along which the clench-blocks are arranged it will be seen that this necessitates a combining of the stapling mechanism and form in such manner as to permit relative shift between the same in the direction of the axis of the form. This of course can be accomplished in the manner shown and described—that is to say, by mounting the form for automatic shift axially during its rotation. With further respect to the frictionally-driven form-shaft which we employ in conjunction with the positive stop device it will be seen that the frictional connection is in the nature of a friction-clutch which is normally closed, or, in other words, normally operative. By "normally" operative we of course mean that this frictional connection, which, as stated, is in the nature of a friction-clutch, is normally and at all times during the use of the machine in condition to transmit power from the driving-shaft to the shaft on which the form is mounted. Preferably, the arrangement involves a power-driven member, a rotary form, a positive stop device for the form, and two frictional connections or friction-clutches intermediate of the driven member and the rotary form. One of said frictional connections, as explained, is manually operated and normally open or inoperative, while the other is normally operative or closed. This arrangement is exceedingly simple and efficient and makes it possible to dispense with the use of certain objectionable forms of power-transmitting connection. In other words, a continuous rotation of the driving-shaft is converted into an intermittent motion on the part of the form by intermittently presenting a positive resistance to the power transmitted through the frictional connection on the upper shaft. By thus intermittently resisting the transmission of power through the frictional connection to the form-shaft we are enabled to dispense with certain objectionable devices, as heretofore stated, and in addition we are enabled to provide a machine which may be run at surprisingly high speed with absolute certainty of action and without danger of breakage.

What we claim as our invention is—

1. A stapling-machine comprising a rotary form mounted to shift axially during its rotation and means for automatically producing the axial shift.

2. A machine for making band-like articles, comprising an intermittently-rotated form mounted to shift axially during its rotation and means for automatically producing the axial shift.

3. A stapling-machine, comprising an intermittently-rotated form provided with two rows of clench-blocks, each row extending circumferentially of the form in an irregular line, suitable staple forming and driving devices, said form being mounted to shift axially during its rotation, and means for automatically producing the axial shift whereby the said clench-blocks are successively presented in proper position beneath the staple forming and driving devices.

4. A machine for making band-like articles slightly higher at two opposite points than at intermediate points, comprising a rotary form provided with a plurality of clench-blocks, the said clench-blocks extending circumferentially of the form in an irregular line, suitable staple forming and driving devices, said form being mounted to shift axially during its rotation, and means for automatically producing the axial shift whereby said clench-blocks are successively presented to said staple forming and driving device.

5. A stapling-machine, comprising suitable staple forming and driving devices, a rotary form having a truly circular circumference, said form being mounted to shift axially during its rotation and means for automatically producing the axial shift.

6. A machine for making band-like articles slightly higher at two opposite points than at intermediate points, comprising suitable staple forming and driving devices, an intermittently-rotated form mounted to shift axially during its rotation, and means for automatically producing the axial shift whereby the staples are inserted at points equidistant, or substantially equidistant, from the edges of said article.

7. A stapling-machine, comprising suitable staple forming and driving devices, an intermittently-rotated form mounted to shift axially during its rotation, and means for automatically producing the axial shift, said form being provided with an axially-adjustable handle and a plurality of pivoted arms for throwing the completed article off the form.

8. A stapling-machine, comprising staple forming and driving devices, an intermittently-rotated form provided with an axially-adjustable handle, and means operated thereby for throwing the completed article off the form, and a tilting guide for feeding the materials onto said form.

9. A stapling-machine, comprising suitable staple forming and driving devices, a rotary form mounted to shift axially during its rotation, and a tilting guide for feeding the materials onto said form and means for automatically producing the axial shift.

10. A stapling-machine, comprising suitable staple forming and driving devices, a rotary form, a stop device adapted and operative to automatically and intermittently interrupt the rotation of said form, and a trip device adapted and operative to automatically prevent said stop device from releasing said form immediately after the driving of the last staples.

11. A stapling-machine, comprising suitable staple forming and driving devices, a rotary form, a driven member, a yielding and continuously-acting frictional connection between said driven member and the rotary form, and a stop device for automatically and intermittently resisting and interrupting the rotary motion imparted through said connection from said driven member to said form, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

12. A stapling-machine, comprising suitable staple forming and driving devices, a rotary form adapted and operative to automatically shift axially during its rotation, a driven member, a yielding and continuously-acting frictional connection between said driven member and said form, and a stop device adapted and operative to automatically and intermittently resist and interrupt the rotary motion imparted to said form through said connection from said driven member, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

13. A stapling-machine, comprising suitable staple forming and driving devices, a rotary form provided on its inner face with a cam-like surface, a roll mounted in stationary bearings and adapted to engage said cam-like surface, and thereby cause the form to automatically shift axially during its rotation, and a pressure device for maintaining said form in contact with said roll.

14. A stapling-machine comprising suitable staple forming and driving devices, a rotary form mounted to shift axially during its rotation, means for automatically producing the axial shift, a spring-held pivoted guide for feeding the materials to said form, a driven member, a yielding frictional connection between said driven member and said form, and a stop device adapted to automatically and intermittently interrupt the rotary motion imparted to said form through said connection from the driven member.

15. A stapling-machine, comprising a rotary work-holder, a driven member, a yielding and continuously-acting frictional connection between said rotary work-holder and said driven member, and a stop device adapted and operative to automatically resist and interrupt the rotary movement imparted to said rotary work-holder through said connection from said driven member, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

16. A stapling-machine, comprising suitable staple forming and driving devices, an intermittently-rotated form mounted to shift axially during its rotation, means for producing the axial shift, said form being provided with a pivot-hook having a spring adapting it to reach over and clamp the desired materials upon the said form.

17. A stapling-machine, comprising a rotary form, said form being provided with a pivoted hook composed of yieldingly-connected sections, said hook being also provided with a spring, whereby the hook may be distended and employed for clamping the desired materials upon the said form.

18. A stapling-machine, comprising suitable staple forming and driving devices, a form mounted to shift axially during its rotation, means including a roll and a cam-surface on the form for shifting the form in one direction, and means including a weight and a bell-crank-shaped lever for shifting the form in the other direction.

19. A stapling-machine comprising a rotary form, suitable staple forming and driving mechanism, and power-operated means for causing relative shift between the form and stapling mechanism in the direction of the axis of said form during the rotation of the form.

20. A machine comprising suitable means for forming and driving fastening devices, a rotary form for holding the work, a driven member, two frictional connections serving as medium of power-transmitting connection between said driven member and form, one of said connections being normally open and manually controlled, the other frictional connection being normally and at all times closed, and a positive stop device for intermittently interrupting the rotation of said form, whereby the continuous rotation of said driven member is converted into intermittent rotary motion on the part of said form by intermittingly presenting a positive resistance to the power transmitted through said connection, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

21. A machine comprising suitable means for forming and driving fastening devices, suitable means for holding and feeding the work, a driven member, a frictional connection arranged as medium of power-transmitting connection between the said driven member and the said means for holding and feeding the work, and a positive stop device for intermittently interrupting the movement of said means, whereby the continuous rotation of said driven member is converted into intermittent motion on the part of said means by intermittently presenting a positive resistance to the power transmitted through said connection, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

22. A machine for use in making baskets, comprising suitable means for forming and driving fastening devices, a rotary work-holding form, a driven member, and a frictional connection serving as medium of power-transmitting connection between said driven member and the rotary form, said connection comprising flat frictional surfaces clamped together with the proper degree of pressure by adjustable set-screws, whereby the continuous rotation of said driven member is converted into intermittent motion on the part of said form by intermittently presenting a positive resistance to the power transmitted through said connection, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

23. A machine comprising suitable means for forming and driving fastening devices, a rotary form for holding and feeding the work, a driven member, a frictional connection arranged as medium of power-transmitting connection between said driven member and form, and a positive stop device for intermittently interrupting the rotation of said form, whereby the continuous rotation of said driven member is converted into intermitttent motion on the part of said form by intermittingly presenting a positive resistance to the power transmitted through said connection, together with power-transmitting connections for operating said stop device at predetermined intervals, whereby the work is given an intermittent feeding movement and is always stationary while being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on the work.

24. In a machine of the character described, the combination of means for holding the work, means for driving fastening devices into the work, a driven member, a frictional power-transmitting connection, and a positive stop device adapted and operative to intermittently offer a positive resistance to the power transmitted from said driven member through said connection to produce relative intermittent feeding movement on the part of said means for holding the work and the means for driving the fastening devices, together with means for operating said stop device at predetermined intervals, whereby the work and means for driving the fastening devices have the said relative feeding movement and are always relatively stationary when the work is being acted on; a power-operated automatic trip device adapted and operative to automatically prevent a continuance of said intermittent motion after the final operation is performed by the machine upon the work or article, and means for manually resetting the mechanism upon the substitution of fresh work for the finished article; and power-transmitting connections, independent of said continuously-acting frictional connection, for operating said trip device and means for performing successive fastening operations on work.

25. A machine for use in making baskets, comprising a rotatable basket-form for the work, a power-driven member adapted for continuous rotation, and a frictional connection and a positive stop device adapted and operative to convert the continuous rotation of said member into intermittent rotation on the part of said form, said stop device operating independently of the work on the form, and independently of the connection between one member of the frictional connection and the said power-driven member, to intermittently stop the rotation of the other member of the frictional connection.

26. In machine for use in making receptacles, comprising means for holding the work and driving fastening devices in the same, a drive-shaft, two independent power-transmitting means extending between said drive-shaft and the said means for holding the work and driving fastening devices, and an automatic positive stop device also operated by one of said power-transmitting means, the other power-transmitting means including a driven shaft intermittently interrupted in its rotation by said stop device, a member fixed to said shaft, a pulley loose on said shaft, means for holding the pulley and member in tight frictional connection, and a belt connecting said pulley with said drive-shaft.

27. A machine for use in making receptacles, comprising means for holding the work and driving fastening devices in the same, power-transmitting connections including a frictional connection and a shaft for operating one or more of the operative parts of said means, an automatic positive stop device for intermittently interrupting the rotation of said shaft, and connections independent of the work, and independent of the said frictional connection, for operating said stop device, said frictional connection comprising one member fixed to said shaft, another member loose on said shaft, and means for holding the two members in tight frictional connection.

28. In a machine for use in making baskets, endwise bodily-movable means for holding the work, power-transmitting connections including a frictional connection, a positive stop device for intermittently interrupting the motion communicated through said frictional connection, and connections independent of the work, and independent of the said frictional connection, for operating said stop device, said frictional connection comprising a shaft, a member loosely mounted on said shaft, a member fixed to said shaft, and means for holding said members in tight frictional connection with each other.

29. In a machine for making baskets, and in combination with suitable means for holding the work and driving fastening devices in the same, a frictional power-transmitting connection, a positive stop device for automatically interrupting the motion transmitted through said frictional connection, and connections independent of the work, and independent of said frictional connection, for operating said stop device, said frictional connections comprising a shaft, a member loose on said shaft, a member fixed to said shaft, and means for holding said members in tight frictional connection with each other.

Signed by us at St. Joseph, Berrien county, Michigan, this 30th day of October, 1903.

JOHN EKLUND.
ENOS L. WALKER.

Witnesses:
O. O. JORDAN,
O. J. BOUMA.